United States Patent Office 2,824,827
Patented Feb. 25, 1958

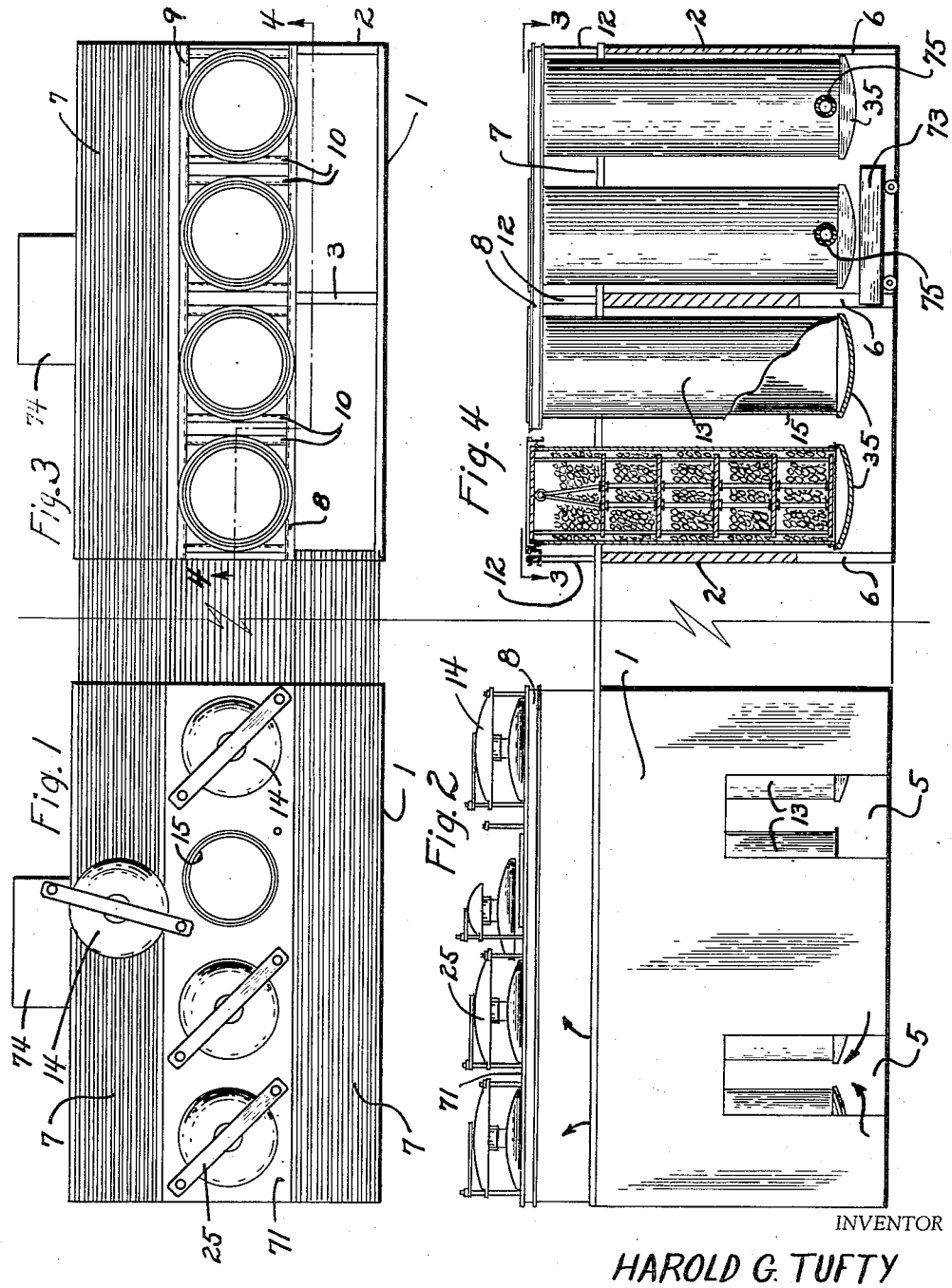

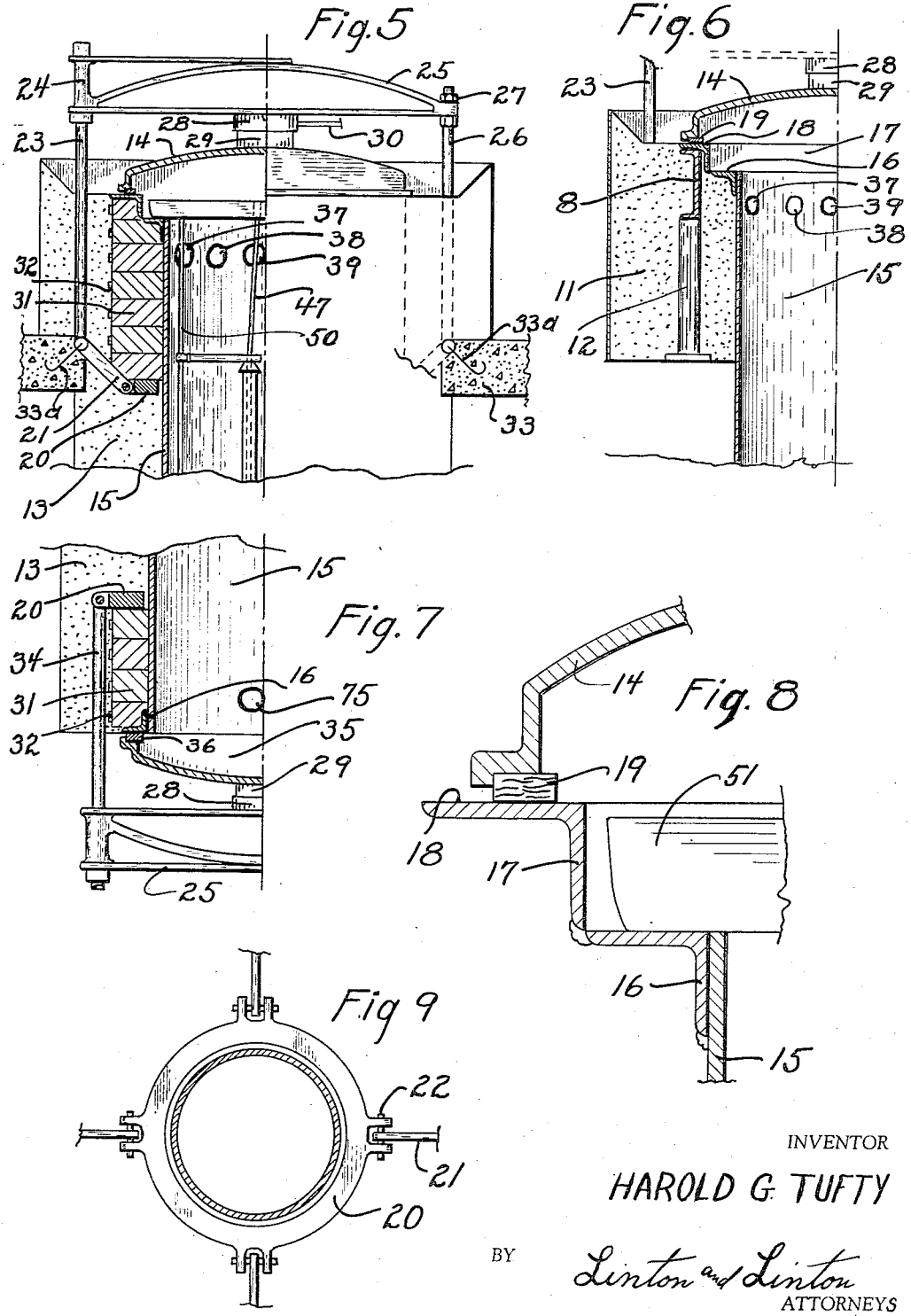

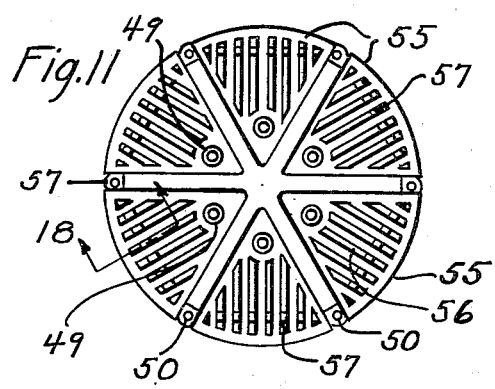
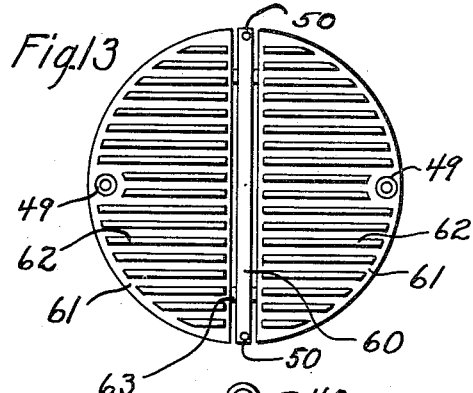
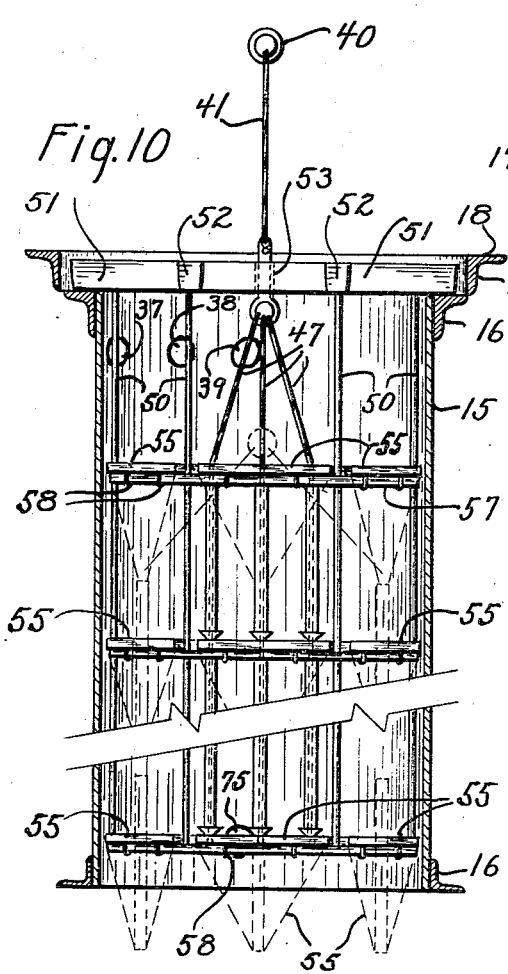
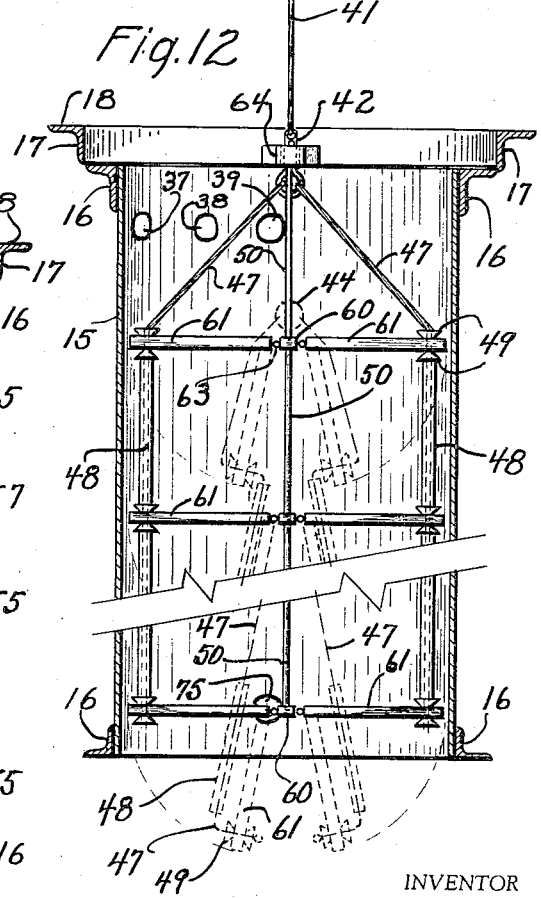
INVENTOR
HAROLD G. TUFTY

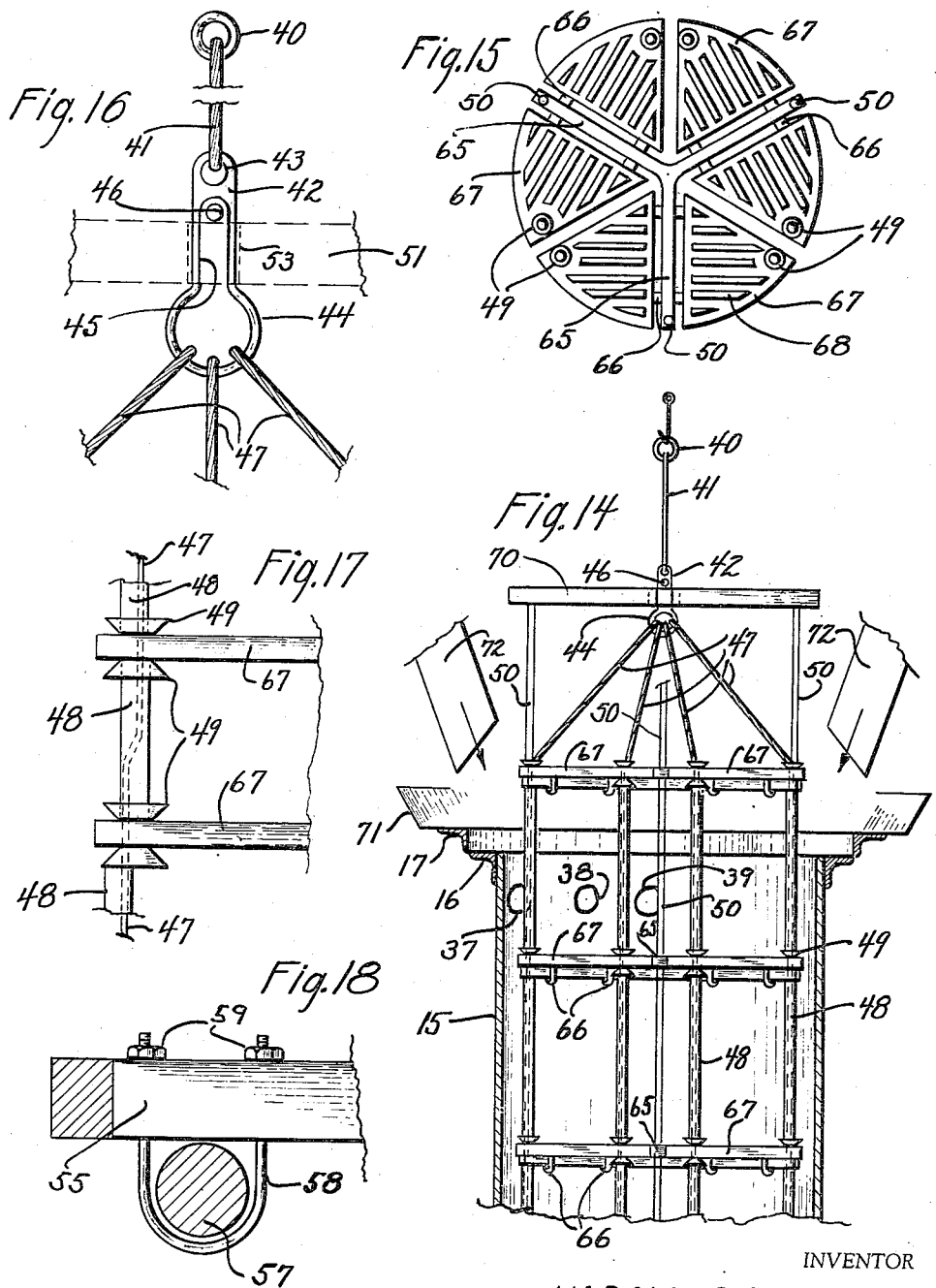

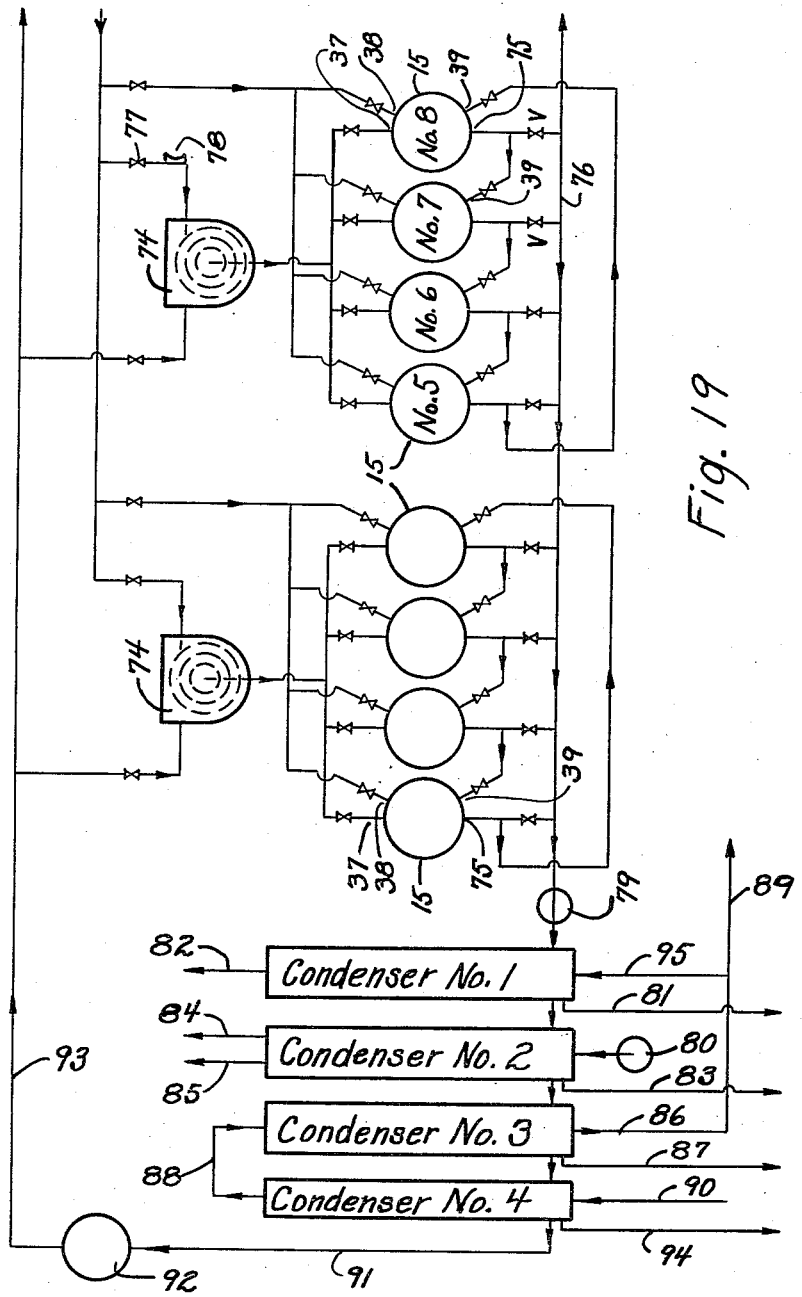

2,824,827

METHOD AND APPARATUS FOR THE LOW TEMPERATURE TREATMENT OF MATERIALS CONTAINING CARBONACEOUS CONSTITUENTS

Harold G. Tufty, Washington, D. C., assignor to Wood Associates, Inc., Washington, D. C., a corporation of Delaware Application July 23, 1952, Serial No. 300,552

10 Claims. (Cl. 202—266)

The present invention relates to the art of treating materials, at moderate temperatures, for removing therefrom volatile constituents as may be present therein and it is particularly concerned with both apparatuses and processes for low temperature distillation of materials, mainly solid carbonaceous materials, for removing the volatile hydrocarbons present in such materials and permitting the collection of such hydrocarbons.

Coal consists of material derived from vegetable matter, decomposed under conditions of slight pressure in the absence of oxygen except that combined within the vegetable matter, followed by a period of moderate pressure. The process of decomposition takes place under stagnant water which also seals out the free oxygen of the air. The processes which take place are threefold: first, fermentation initiated by non-oxygen requiring bacteria, the fermentation resulting in the elimination of carbon dioxide; second, the formation of gaseous hydrocarbons (ethane and methane) which are eliminated by spontaneous escape under slight to moderate pressure; and third, a process of dehydration in which the oxygen is eliminated and some of the hydrogen retained. The original vegetable materials were carbohydrates (carbon, hydrogen, and oxygen in various combination), largely cellulose and lignin plus some resins and waxes, and the net result of the three processes is the deoxygenation of this material with the creation of hydrocarbons. A full range of the homologues appears in each of the three major groups, paraffin, olefin, and aromatic. Because of the escape of the simpler gaseous compounds the coal is rich in the more complex hydrocarbons, many of which are solids at normal atmospheric temperatures. Mixed with the hydrocarbons is of course free carbon, and the sedimented salts of the minerals dissolved in the water under which the coal was formed as well as the materials washed into the water from the surrounding land. These salts and silts constitute the ash.

The process described here deals principally with a method for extracting the naturally occurring hydrocarbons in coal with a minimum of decomposition of those compounds. Essentially, the volatile hydrocarbons are vaporized by the application of heat, and are withdrawn from the solid lumps by the fact that the relatively lower external pressure present in the retort draws the vapors out. If the temperature inside the treating chamber is not allowed to exceed the critical or decomposition temperature, the hydrocarbons may be taken from the chamber in their complex forms, provided only that they are not condensed and revaporized in the cooler parts of the retort too many times.

Each of the hydrocarbons present in the coal vaporizes at a specific temperature, and because of the large number present the range of vaporization temperatures is an orderly series from 50° F. to 800° F. or slightly more. As the temperature of the coal is slowly and steadily raised, each of the hydrocarbons vaporizes at its own boiling point which may be a range of temperatures. They are therefore selectively removed from the coal, the more volatile first, and consequently the fusing temperature of the coal left steadily rises. As a side effect, the hydrocarbons left after each fractional withdrawal recombine and regroup to form new compounds, which may have properties quite different from the compounds from which they were derived. These reactions of recombination are in sum exothermic, releasing about 300 B. t. u. per pound of coal put into process. This heat must be accounted for in the heat balance of the process.

There are two great families of hydrocarbons present in the coal, derivatives of lignin being the first, and derivatives of resins being the second. The vaporization points of the lignin derivatives are grouped around a mode at approximately 200° C. and with complete vaporization occurring at about 250° C. and decomposition of these compounds beginning at about 300° C. If the compounds can be removed from the heating chamber before they reach this temperature, they can be obtained substantially unchanged. The resin derivatives volatilize at higher temperatures, beginning to melt at about 250° C. with the mode of volatilization temperatures at about 300° C. and decomposition setting in about 350° C. Removal of the complex hydrocarbons is virtually complete at about 420° C. including the aliphatic compounds which are derived from the waxes. Little is known of the behavior of these aliphatic compounds under moderate heat, but it is known that at temperatures up to 500° C. such compounds remain stable.

The essential point of this theory is that the volatile hydrocarbons can be removed in an orderly series by the application of slowly increasing heat, with a top temperature of approximately 500° C. The residue from the low temperature distillation of the coal is a coke, containing a high percentage of free carbon, plus a small percentage of the hydrocarbon volatiles originally present. The formation of a dense coke is fostered by an absence of free oxygen in the heating chamber. The effect is apparently due to the lack of combustion at the surface of the coke lumps, and the lack of evolution of excessive gas which would be caused by the presence of oxygen, which in turn induces excessive temperature, particularly during the short period when the coal and coke are plastic in character.

It seems to be desirable to control the rate at which the heat induced in the coal increases. A low temperature gradient permits the hydrocarbon vapors produced to get out of the lumps without causing excessive swelling of the coal. This control of swelling is important, to prevent fusing, since the lack of pressure between the lumps prevents the lumps from fusing together at the points of contact. If the coal is strongly coking in character, the heat should not rise more than 1¼° C. per minute if the gas produced is to get out of the coal without excessive pressure being created inside the lumps. With a substantially non-coking coal the rise in the temperature at any point within the lump of coal should not exceed approximately 10° C. per minute if the fusing of the coal is to be kept at a minimum. Since most of the coals of the United States are intermediate between strongly coking and non-coking, a separate control must be computed for each type of coal, and the process controlled by controlling the amount of heat introduced into the heating chamber.

The initial object of the invention is to provide an apparatus capable of automatic operation, for the low temperature distillation of various coals and the low temperature treatment of other materials, into which the material can be easily and quickly loaded and unloaded, and which apparatus can be economically constructed and operated for producing low cost coke, tar and the like, rendering the same commercially desirable.

A further and important object of the invention is to provide a low temperature distillation apparatus wherein the material to be treated is fed into the treating area from the top thereof and the resulting products are removed from below the heating area while the material during treatment is maintained relatively free from overhead pressure from the materials thereabove, will not fuse unduly and thereby become difficult to remove and to be broken up during unloading to minimize the effects of such fusing as may occur.

A still further object of the invention is to provide an apparatus for the low temperature treatment of materials where the heating areas utilize in turn, the entire superheater load and wherein the amount of heat introduced into the enclosed heating areas, in turn, can be regulated by controlling the flow of superheated heating medium for a fixed time or percentage of operating cycle duration.

Another object of the invention is to provide an apparatus for the low temperature treatment of materials wherein the heat included in the materials produced therefrom are recovered to the maximum extent possible and are used to reduce the amount of new heat to be supplied to the process.

Another object of the invention is to provide a process by which materials containing carbonaceous matter are distilled at a moderate temperature under predetermined conditions of time, temperature and heat input by the internal application to them of superheated inert gases, such as steam, flue gases and other gases devoid of free oxygen.

Another object of the invention is to provide a process for treating carbonaceous material to produce larger amounts of cyclic hydrocarbons than are produced in known processes, to produce a higher proportion of the more complex homologues of the cyclic series of hydrocarbons and which process is also adaptable to use with both coking and non-coking coals for producing both high and low temperature coke.

Other objects of the invention will be in part obvious and in part pointed out in the following description of the accompanying drawings in which:

Fig. 1 is a top view of one bank of retorts showing one of the retorts open.

Fig. 2 is a side elevation of the bank of retorts of Fig. 1.

Fig. 3 is a top view partially in section taken on line 3—3 of Fig. 4.

Fig. 4 is a vertical section taken on line 4—4 of Fig. 3.

Fig. 5 is an enlarged detail view partly in section of the top portion of one form of retort and support therefor.

Fig. 6 is also an enlarged detail view of a vertical section through half of the top portion of a modified form of retort and its support.

Fig. 7 is an enlarged detail vertical section through a half of the bottom portion of a retort.

Fig. 8 is a greatly enlarged detail view of the immediate support and seal for the retort and its cover.

Fig. 9 is an enlarged top view of the pressure thrust ring.

Fig. 10 is an enlarged vertical section through one form of distillation chamber according to the present invention.

Fig. 11 is a top view of a coal supporting plate as shown in Fig. 10.

Fig. 12 is an enlarged vertical section of a second form of distillation chamber.

Fig. 13 is a top view of a modified form of supporting plate as employed in Fig. 12.

Fig. 14 is an enlarged vertical section of a third form of distillation chamber.

Fig. 15 is a top view of a further modified form of supporting plate as used in the retort of Fig. 14.

Fig. 16 is an enlarged detail side view of a cable hanger.

Fig. 17 is an enlarged detail side view of the cable guides taken on line 17—17 of Fig. 15.

Fig. 18 is an enlarged detail view of a supporting plate hinge taken on line 18—18 of Fig. 11; and Fig. 19 is a plan view of a plant according to the invention including ancillary apparatus.

Referring now more in detail to the accompanying drawings, wherein like and corresponding parts are designated by similar reference characters, numeral 1 refers to a pair of side masonry walls connected by end walls 2. An intermediate masonry wall 3 extends between the medial portion of said side walls. Walls 1 also have openings 5 formed therethrough serving the dual purpose of doorways and also air inlet ducts, while walls 2 and 3 also have openings 6 formed therethrough providing a longitudinal passageway and also openings for the admission of air at the bottom of these supports.

A pair of gratings 7 each extend longitudinally along the side top portion of walls 1, 2 and 3 providing a walk for persons and also an outlet for air passing upwardly from within the walls. Between these gratings 7 there extends a pair of parallel channel irons 8 and 9 connected together by cross bars 10 which are spaced apart as best shown in Fig. 3 of the drawings. Channel irons 8 are supported upon and above walls 2 and 3 by means of supports 12 mounted on these walls. Baffles 4 extend between the channel irons 8 and gratings 7 for closing the space therebetween.

A series of insulation covered retorts 13 each extend downwardly between a pair of cross bars 10 and have a removable cover 14 for the top thereof. These retorts contain an open topped cylindrical metallic casing 15 whose upper peripheral edge has an angle iron 16 extending radially therefrom with the outer periphery edge of circular angle iron 16 fixedly attached to the lower edge of the vertical arm 17 of a second angle iron 18 which is also circular in configuration. Angle iron 18 rests upon channel iron 8 and adjacent cross bars 10 for supporting the entire retort. The upper face of circular angle iron 18 has a gasket 19 positioned thereon. A modified form of retort support is shown in Fig. 5 of the drawings as hereinafter described.

A ring 20 shown in detail in Fig. 9 of the drawings surrounds the cylinder 15 of each retort and has a plurality of radially extending links 21 pivotally connected at 22 thereto. The opposite end of link 21 is pivotally connected to the lower end of rod 23 which in turn has bearings 24 mounted upon the upper end thereof to which is attached an arm 25. Said arm 25 is therefore capable of sliding vertically on and pivoting around rod 23 whereby its opposite end which has an opening formed therein can be placed on rod 26 and retained by a nut 27 in threaded engagement with said rods 26. Said arm 25 carried a hydraulic cylinder 28 at the center thereof from which downwardly extends a piston 29 and which cylinder is connected to a source 30 of a hydraulic fluid or compressed air for operating said piston and pressing downwardly on cover 14 when desired. This rod 26 is also pivotally connected to a link 21 attached to said ring 20.

Fire bricks 31 are stacked upon the top of ring 20 and are retained around the upper portion of cylinder 15 by means of a series of bands 32. The lower ends of rods 23 and 26 are attached to a concrete floor 33 carried by said walls 1, 2 and 3 by means of a J-shaped hook 33a.

The lower end of the retort cylinder 15 employing either the arrangement of Fig. 5 or Fig. 6 has a peripheral edges of the lower end thereof surrounded by a circular angle iron 16 on top of which is positioned fire bricks 31 and their connecting bands 32 and on top thereof is positioned a second ring 20 to which is pivotally connected a rod 34 having a slidable and pivotal arm 25 mounted on the lower end thereof.

A gasket 36 is positioned against the lower face of the bottom angle iron 16 for sealing the interior of the retort when cover 35 is placed against the bottom thereof. Said cover 35 is retained in its closing position by a second hydraulic cylinder 28 through its piston 29 and which cylinder is carried by the lower arm 25.

Retort cylinders 15 provide the enclosed heating area for the material to be treated and, accordingly, have inlet openings 37, 38 and 39 formed through the top portion through which can be introduced various materials as hereinafter described.

The material to be treated such as coal is introduced into the retort 15 and supported therein by a series of supporting plates. These supporting plates are moved by a ring 40 which can be attached to any suitable arrangement for raising and lowering the same and from which depends a cable 41. The lower end of cable 41 is connected to a connector 42 by passing through and around opening 43 formed therein. The lower end of the connector 42 is in the form of a ring 44 with a channel 45 extending thereabove and through which a pin 46 can be passed for retaining purposes. From said ring 44 there extends a plurality of cables 47 each of which pass through a series of tubes 48 and conical collars 49 which are fixedly mounted on each supporting plate positioned in relation to an end of each tube as shown in Fig. 17. The plate arrangement for supporting the material being treated can greatly vary and as examples applicant has presented herewith three modifications of such arrangements. In Fig. 10 there is shown the first form of supporting plate arrangement wherein a plurality of rods 50 extend downwardly each from the end portion of an arm of a six spoked bar 51 through the end portions of which are formed threaded openings 52 for engaging the threaded ends of said rods 50.

The supporting plate employed in this present arrangement as shown in Fig. 11 consists of six sector shaped supporting plates 55 each having a plurality of slots 56 formed therethrough and which plates when grouped together form a circle. A hexagon shaped bar 57 each side of which extends as a tangent across each supporting plate 55 has the same pivotally connected thereto by means of a plurality of U-bolts 58 which extend through supporting plate 55 around rod 57 and are fastened in place by nut 59 as shown in Fig. 18 of the drawings.

Cables 47 pass through the tapered guides 49 on each side formed through the apex of each sector 55 down through tubes 48 and are fastened beneath the bottom supporting plate.

In Fig. 12 there is shown a second form of supporting plate arrangement wherein is employed a straight bar 60 to the opposite sides of which are pivotally connected a pair of semi-circular plates 61 each having a plurality of slots 62 therethrough with the plates attached by hinges 63 to bar 60. Rods 50 are connected to each end of bars 60 while cables 47 pass through the guides 49 at the outer edge of each plate 61.

Cable 41 has connector 42 extending through a straight bar 64 with an opening at its center and with bar 64 normally extending across the top faces of the angle bar 16.

In Fig. 14 there is shown a third arrangement of the coal supporting plates for the retort employing a supporting plate such as shown in Fig. 15 employing a Y-shaped bar 65 having rods 50 extending through the ends thereof and fixedly connected thereto. Between each pair of arms of said bar 65 there is positioned a pair of sector shaped plates 67 each having a plurality of slots 68 formed therethrough and which plates when grouped together form a complete circle. The base of each plate 67 is hingedly connected to a side of an arm of the bar 65 by means of hinges 66.

A Y-shaped supporting bar 70 has connector 42 extending through an opening at the center thereof which opening is smaller than ring 44 whereby the bar 70 must rise with the raising of cable 41, but normally is positioned upon the top face of angle bar 16 and when pin 46 is positioned through passage 45 and above said bar 70, then the plates are prevented from further downward movement due to their connection thereto through cables 47. Said cables extend through openings at the apex of each plate 67 pass through guides 49 on each side of said plates and the tubes 48 positioned between each supporting plate. The lower end of said cables 47 beneath the bottom plate is knotted to enlarge the same to prevent its upward movement through the lowermost guides 49.

A coal receiving and guiding circular pan 71 having inwardly tapering side walls is positioned upon face 18 of angle bar 17 and is fixedly connected thereto. In Fig. 14, by way of example only, there is indicated a pair of coal introducing elements 72 which may be tubes or any other conventional means for supplying coal, or other material to be treated, onto the pan 71 and from there onto the plates as presented thereto.

In Fig. 19 there is shown a plan view of a plant employing the present invention and in which is shown two banks of four retorts 15 each. One bank or additional banks can be employed as conditions warrant. Each of said banks is connected to a superheater 74 in which the steam is superheated before introduction to the retort. Four retorts are shown as being connected to one superheater 74 and this number is based upon the number of retorts which will take 100% of the superheater load. This is based upon the following equation:

$$\frac{T}{P \times N} = 1$$

For example:

$$\frac{\text{Duration of cycle}}{\text{Superheat period} \times \text{No. of retorts}} = 1$$

The retorts are also positioned in line for the purpose of simplifying the feeding of coal and the withdrawal of the end products inasmuch as a supply of coal can be fed along the tops of the retorts and introduced in each of the pans 71 while the coke can be withdrawn from the bottom of each retort 15 into some means such as a cart 73 which can travel in line beneath the bottom of the retorts.

In operation of the present retorts it is first necessary to withdraw pressure from the hydraulic cylinder 28 whereby each of the covers 14 are raised and upon removal of nut 27 arm 25 can be raised and pivoted around rod 23 in the manner of the third cover 14 of Fig. 1.

Then by any suitable means, ring 40, cable 41 and the appended elements, such as connector 42, cables 47 and attached supporting plates can be raised upwardly from within the retort 15. Rods 50 maintain the supporting plates as well as their supporting bars 51, 64 or 70 spaced apart at all times. Upon the bottom supporting plate reaching a position level with pan 71, coal is fed thereonto until a sufficient load is received whereupon cable 41 is lowered until the next supporting plate is level with the pan 71 whereupon it is loaded and the next supporting plate lowered to the same position and loaded and this continues until all supporting plates have received their supply of the material to be heated at which time their supporting bar 51 or the like will be resting on the top of angle iron 16.

Arm 25 is then pivoted placing cover 14 in its closed position upon the gaskets 19 whereafter nut 27 has fastened the end of arm 25 on rod 26, pressure is supplied to cylinder 28 for maintaining cover 14 in its closed position. The pressure from cover 14 is transmitted from piston 29 through arm 25 to the rods 23 and 26 down to ring 20 and thus upwardly through fire bricks 31 returning the pressure against the angle bar 18 supporting cover 14.

The bottom cover 35 has similar elements for supporting, pivoting and sealing the same in position in a like manner to cover 14. With the retort completely sealed superheated steam is introduced through port 37 into the interior of the retort where it permeates downwardly to the bottom thereof. After a suitable time the superheated steam is cut off and quenching steam is introduced through port 38 which forces the heat of the charge created by the superheated steam downwardly and out through the bottom port 75, where part or all of this residue stem is introduced into the next retort No. 7 through port 39.

After the coal has been adequately treated both cover 14 and 35 are removed from the retort, pin 46 removed and cable 41 permitted to drop downwardly within the retort. This places a slack upon cables 47 which allows the supporting plates 55, 61 and 67 to pivot and drop downwardly as indicated by the dotted lines in Figs. 10 and 12. Since the tubes 48 and guides 49 are not connected, they provide a flexibility for the cables 47 as shown in Fig. 12 with the bottom supporting plate 61 dropping first, the intermediate second, and the top supporting plate third, allowing the coke to readily drop into the cart 73 for being taken away.

Supporting plate 55 extends upon both sides of its supporting bar 57 and consequently pivots with its apex dropping downwardly into position on the opposite side of bar 57 giving the material thereon a sudden push which assures of its being cleared therefrom.

After the removal of the coke, cable 41 is again raised until all supporting plates are in their horizontal position and cables 47 are taut. Guides 49, as shown in Fig. 17, guide the cables and tubes 48 back into a straight line due to the tapered formation of the guides assuring that the same are in their proper position. Pin 46 is put back in position and then the retort is ready for receiving and treating a further load of material.

The vapor from ports 75 is further utilized by introduction into condensers Nos. 1, 2, 3 and 4.

As an example of the operation of the present apparatus in actually treating the material, a cycle time of six hours has been selected for this purpose, of which period 1 and ½ hours will be devoted to the introduction of superheated steam into each retort, 4 hours to the quenching or cooling period through the introduction of quenching steam through port 38 and ½ hour to the unloading and reloading of the retort with a fresh charge of material at which time no steam is introduced.

Assuming that retort No. 7 has been reloaded with fresh coal and the ½ hour period is at an end, retort No. 8 which has just finished the preheat period now has superheated steam introduced from superheater 74 by the opening of the valve for port 37 of retort No. 8. Valves for ports 38 and 39, and valve V for port 75, are closed while the valve for port 39 of retort No. 7 is open as well as is valve V for port 75 of retort No. 7. Valves for ports 37 and 38 of retort No. 7 and the valve for port 39 of retort No. 6 are closed. This permits the superheated steam introduced at the top of retort No. 8 to move down through the charge therein, exit through port 75 and travel into the top port 39 of retort No. 7. From here the partially cooled steam travels down through the charge in retort No. 7 and out through the bottom port 75 into the vapor line 76 and on to the condensers due to the closing of the valves to ports 37 and 38 of retort No. 7 and valve to port 39 of retort No. 6.

By way of further control of the maximum temperature in retort No. 7 during its preheat period valve V of port 75 of retort No. 8 may be opened slightly if it is desirable to reduce the preheat temperature a little by exhausting part of the hot steam directly into line 76 and on to the condensers.

Retorts No. 5 and 6 which are assumed to be in their quenching or cooling period, have valves for ports 38 open at the top and the valves V for ports 75 open at the bottom so that the vapors during this period are taken directly to the condensers as the valves for ports 37 and 39 of these retorts are closed.

In all previously known apparatus of the present type the port valves have been operated on a pressure reducing principle to control the heat input into the retorts, but in the present apparatus the heat input is regulated by controlling the flow of a constant pressure of steam or superheated media. For this purpose known types of valves are employed which are spring self-closing with either diaphragms or solenoids for opening and closing the same and accordingly, the valves 77 controlling the flow of steam to the superheater and the valves of ports 38 are flow controlled by conventional apparatus. All ports 37, 39 and 75 are either fully opened or off as conditions require, except valve V as noted above during preheat temperature control. Valve 78 is a safety valve to protect the superheater in the event of accidental closing of any of the ports 37.

At the end of the superheating period for retort No. 8 the previously described procedure is duplicated with regard to retorts Nos. 6 and 7 so that retort No. 7 becomes superheated, while retort No. 6 is being preheated.

In order to utilize to the fullest extent the heat that passes off from the vapor line 76, the same is exhausted by fan 79 to condenser No. 1 which is fed with the boiler feed water for being cooled thereby and the temperature held very close to the boiler temperature of about 341° at approximately 120 gauge. The condenser is held at this temperature to condense out the heaviest oils from the vapor.

Condenser No. 2 is cooled by air from blower 80 and the heated air sent to the boilers and parts passed over the coal to be treated so as to dry the same whereupon it can be more economically treated by the superheated steam than moist coal.

Condenser No. 3 which received the vapor from condensers Nos. 1 and 2, in that order, cools the vapor to approximately 120° F. and the resulting heat can be used for partially heating the boiler feed water and also supply hot water to the heating coils in the oil storage tanks so as to keep these oils in a fluid condition at all times. Condenser No. 4 is cooled by a 70° cooling water from line 90 and is used to cool the remaining vapors which by this time has had all condensible oil vapors removed and all that remains is a non-condensible combustile gas that is passed through pipe 91 to a storage holder 92 and later used in the heating of the steam boilers and the superheaters as they move through pipe 93. This condenser No. 4 can also be used in the initial heating of the boiler feed water.

While four condensers have been described, there may be more or fewer condenser steps with the number being dependent upon the gravity of the oils desired and the heat requirements of the various heat recovery devices.

The aforementioned apparatuses and processes described in connection therewith are capable of considerable modification and such changes thereto as come within the scope of the appended claims are deemed to be a part of the invention.

I claim:

1. Material supporting and dropping device for open end cylindrical retorts comprising a cable, a bar capable of being positioned across and on the top end of said retort, means for at times connecting said cable to said bar, a plurality of rods extending downwardly from said bar, a plurality of superimposed bars each extending across the interior of said retort and connected to said rods, a plurality of supporting plates each pivotally connected to one of said bars and of a configuration for forming a circular grate with the other plates of the same bar, and a plurality of cables connected to said first mentioned cable and each connected to a plurality of said supporting plates one below the other.

2. A material supporting and dropping device for open end cylindrical retorts as claimed in claim 1, wherein said plurality of bars are each of a hexagon configuration, said supporting plates each have the configuration of a sector of a circle and pivotally mounted on a side of one of said bars with said side extending as a secant to the curved portion of said plate and said plate openings being positioned at the apex of said plates.

3. A material supporting and dropping device for open end cylindrical retorts as claimed in claim 1 wherein said plurality of bars are each of a straight configuration, said supporting plates each have a semi-circular configuration and have their base pivotally connected to a side of one of said bars and said plate openings are positioned at an outer edge portion of each plate.

4. A material supporting and dropping device for open end cylindrical retorts as claimed in claim 1 wherein said plurality of bars are each of a Y-shaped configuration, said supporting plates each have the configuration of a sector of a circle and are pivotally connected along one edge to a side of a leg of one of said bars and said plate openings are positioned at the apex of said plate from the pivoted side thereof.

5. A material supporting and dropping device for open end cylindrical retorts as claimed in claim 1, wherein said bar has a central opening, said connecting means consists of connector plate slidably mounted through said bar opening and having an opening in the top to which said cable is attached, a slot in the medial portion and a circular end portion to which said plurality of cables are attached and a pin extending through said slot above and across said bar when said plate extends through said bar opening preventing movement of said plate relative to said bar.

6. Material supporting and dropping device for open end cylindrical retorts comprising a cable, a bar capable of being positioned across and on the top end of said retort, means for at times connecting said cable to said bar, a plurality of rods extending downwardly from said bar, a plurality of superimposed bars each extending across the interior of said retort and connected to said rods, a plurality of supporting plates each pivotally connected to one of said bars and of a configuration for forming a circular grate with the other plates of the same bar, a plurality of cables connected to said first mentioned cable, each of said supporting plates having an opening provided therethrough, a pair of conical guides each mounted on an opposite side of one of said supporting plates in line with said opening therein, a plurality of tubes loosely positioned each between a pair of said guides and a plurality of cables connected to said first mentioned cable, extending through said tubes and guides and knotted below the guide of the lowermost supporting plate to prevent upward movement therethrough.

7. Apparatus for the low temperature treatment of various materials, comprising a cylindrical retort formed open at the top thereof, a circular angle iron collar surrounding and connected to the open end of said retort, a second circular angle iron collar with its inside diameter equal to the outside diameter of the first collar referred to above, and having its inner edge connected to the peripheral edge of the first mentioned collar and its top surface extending substantially perpendicular to the axis of said retort, a cover for the open end of said retort, a gasket for said cover for resting on second collar face, means for moving said cover and closing said cover under pressure, a series of pivotally supported plates slidably mounted in said retort, a supporting bar capable of extending across said first mentioned angle iron collar and being positioned thereon, means for introducing superheated inert gases into said retort, and means of conveying products of distillation therefrom.

8. A support and closure arrangement for an open end retort comprising a retort, stepped annular collars surrounding and connected to the open end of the retort, a cover capable of being positioned on said collar and closing said retort, a circular ring loosely surrounding a median portion of said retort, a support, a plurality of radially extending links suspending said retort from said support, and masonry surrounding the upper portion of said retort and extending between said stepped annular collar and said circular ring.

9. A closure for the open end of a retort, comprising a retort, a circular ring loosely surrounding a median portion of said retort, a pair of rods pivotally connected to said ring, an arm pivotally mounted on one of said rods, means for detachably connecting said arm to the other of said rods, a closure device mounted between the retort cover and said arm, an annular collar surrounding and connected to the open end of said retort, masonry surrounding the lower end of said retort, and extending between said circular ring and said annular collar.

10. Apparatus for the low temperature treatment of various materials comprising a foundation, an open end retort vertically positioned on said foundation, a cover for each open end of said retort, a plurality of vertically extending rods mounted on said foundation with a pair thereof adjacent to and on opposite sides of said retort, an arm slidably and pivotally mounted on said pair of rods adjacent said retort, means for fastening the free end of said arm to the other rod of said pair, a hydraulic cylinder carried by said arm, the piston of said hydraulic cylinder being connected to one of said retort covers, means for supplying and withdrawing pressure from said cylinder as desired, a series of superimposed spaced baffles slidably and pivotally mounted in said retort and means for supplying superheated inert gas to said retort.

References Cited in the file of this patent
UNITED STATES PATENTS

| | | |
|---|---|---|
| 38,560 | Cole | May 19, 1863 |
| 447,506 | De Mill | Mar. 3, 1891 |
| 769,177 | Mathiew | Sept. 6, 1904 |
| 817,552 | Fiveash | Apr. 10, 1906 |
| 821,323 | Wurtz | May 22, 1906 |
| 824,872 | Jewett | July 3, 1906 |
| 840,957 | Pride | Jan. 8, 1907 |
| 917,531 | Brown | Apr. 6, 1909 |
| 1,243,776 | Stone | Oct. 23, 1917 |
| 1,467,506 | Schwenke | Sept. 11, 1923 |
| 1,602,128 | Smith | Oct. 5, 1926 |
| 1,710,070 | Records | Apr. 23, 1929 |
| 2,248,677 | Garman | July 8, 1941 |
| 2,466,593 | Jones | Apr. 5, 1949 |
| 2,655,470 | Clark | Oct. 13, 1953 |

FOREIGN PATENTS

| | | |
|---|---|---|
| 510,196 | Germany | Oct. 17, 1930 |